United States Patent [19]

Medwin

[11] Patent Number: 5,206,036
[45] Date of Patent: Apr. 27, 1993

[54] APPARATUS FOR SHAPING FIBER REINFORCED RESIN MATRIX MATERIALS

[75] Inventor: Steven J. Medwin, Wilmington, Del.

[73] Assignee: E. I. Du Pont de Nemours and Company, Wilmington, Del.

[21] Appl. No.: 603,280

[22] Filed: Oct. 25, 1990

Related U.S. Application Data

[60] Division of Ser. No. 463,898, Jan. 9, 1990, Pat. No. 5,077,110, which is a division of Ser. No. 347,054, May 4, 1989, Pat. No. 4,927,581, and a continuation-in-part of Ser. No. 259,837, Oct. 19, 1988, abandoned.

[51] Int. Cl.$^5$ .................. B29C 53/40; B29C 55/00
[52] U.S. Cl. ...................... 425/327; 72/296; 425/383; 425/406
[58] Field of Search ............ 264/108, 288.4, 290.2, 264/290.5, 290.7, 291, 292, 231, 339, 137, 288, 288.4, 294, 257, 258; 72/296, 57, 295, 297, 342.4; 425/112, 113, 115, 116, 397, 117, 121, 125, 126.1, 140, 160, 320, 321, 322, 325, 327, 328, 334, 335, 343, 446, 466, 383, 392, 324.1; 156/160, 494, 229

[56] References Cited

U.S. PATENT DOCUMENTS

| | | | |
|---|---|---|---|
| 2,434,379 | 1/1948 | Wiesner et al. | 425/397 |
| 2,446,089 | 7/1948 | Hochreiter | 72/797 |
| 2,553,092 | 5/1951 | Hubbert | 72/297 |
| 2,850,071 | 9/1958 | Kraybill | 425/397 |
| 2,856,634 | 10/1958 | Ames | 264/291 |
| 2,939,179 | 7/1960 | Penman et al. | 264/134 |
| 3,073,373 | 1/1963 | Wheeler et al. | 72/297 |
| 3,354,253 | 11/1967 | Rasmussen | 264/288 |
| 3,426,569 | 2/1969 | Brauer et al. | 72/295 |
| 3,550,422 | 12/1970 | Potter | 72/342 |
| 3,732,347 | 5/1973 | Hunt | 264/231 |
| 3,827,683 | 8/1974 | Seberg et al. | 425/397 |
| 3,836,412 | 9/1974 | Boustary et al. | 156/62.2 |
| 3,908,428 | 9/1975 | Mackenzie | 72/296 |
| 3,914,103 | 10/1975 | Dean et al. | 425/397 |
| 4,361,527 | 11/1982 | Rau | 264/25 |
| 4,379,798 | 4/1983 | Palmer et al. | 428/113 |
| 4,419,319 | 12/1983 | Reynolds et al. | 264/292 |
| 4,548,065 | 10/1985 | Vyhnal | 72/413 |
| 4,555,378 | 11/1985 | Martin et al. | 264/292 |
| 4,622,254 | 11/1986 | Nishimura et al. | 428/102 |
| 4,657,615 | 4/1987 | Braun et al. | 156/245 |
| 4,657,717 | 4/1987 | Cattanach et al. | 264/10.2 |
| 4,704,886 | 11/1987 | Evert et al. | 72/57 |
| 4,789,328 | 12/1988 | Knoll | 425/397 |
| 4,927,581 | 5/1990 | Medwin | 264/108 |
| 4,960,558 | 10/1990 | Short | 425/132 |
| 5,066,351 | 11/1991 | Knoll | 425/397 |

FOREIGN PATENT DOCUMENTS

| | | | |
|---|---|---|---|
| 404643 | 10/1973 | U.S.S.R. | |
| 811261 | 4/1959 | United Kingdom | 72/297 |

Primary Examiner—Willard Hoag

[57] ABSTRACT

Apparatus for shaping elongated composite structures of a resin matrix reinforced with randomly broken fibers oriented in transverse and non-transverse directions with respect to the longitudinal axis of the structure is implemented by a computer aided apparatus for forming the structure. The apparatus is provided with a heated fixed forming tool, a means for stretching the structure from each end and means associated with the forming tool for separately holding each formed component length of the structure in place against the forming tool. The formed structure has the particular orientation of the fibers in the transverse and non-transverse direction after the structure is formed.

1 Claim, 11 Drawing Sheets

APPARATUS FOR SHAPING FIBER REINFORCED RESIN MATRIX MATERIALS

This is a division of application Ser. No. 07/463,898 filed Jan. 9, 1990, now U.S. Pat. No. 5,077,110 which application was a division of Ser. No. 347,054 filed May 4, 1989, now U.S. Pat. No. 4,927,581 and a continuation-in-part of Ser. No. 259,837 filed Oct. 19, 1988 and now abandoned.

BACKGROUND OF THE INVENTION

This invention relates to an apparatus for shaping fiber reinforced resin matrix materials. More particularly, the invention relates to an apparatus used to shape the material while substantially maintaining the orientation of the fibers in the material relative to each other and the product thereof.

It is known that many thermoplastic resin materials can be shaped by means of various metal forming techniques, such as deep drawing, stretch forming, stamping, binding, etc. It is also known to reinforce the resin material with fibers such as glass, carbon, aramids and the like to provide higher strength, impact resistance and dimensional stability. However, the shaping processes of the prior art when applied to resin material structures that have fibers oriented in multiple directions suffer from the inability to maintain the orientation of the fibers relative to each other during the shaping of the structure. In many cases this leads to lower mechanical strength. One way to overcome this problem has been to hand lay-up the shaped structure from discrete segments of the fiber reinforced resin material, then consolidate the hand layed-up material into final form and in this manner control fiber orientation. This process is very labor intensive, time consuming and costly.

SUMMARY OF THE INVENTION

According to the present invention, an apparatus has been developed which facilitates the shaping of fiber reinforced resin matrix structures from a straight stock shape and provides a method of controlling orientation of the fibers in the structure without the need to hand lay-up the structure. More specifically, the method of shaping into a predefined path an elongated composite structure of resin matrix reinforced with fibers comprises the steps of:

a) defining said path as a plurality of component lengths;
b) stretching said structure from each of its ends by applying a force to each end along its longitudinal axis to shape the structure into successive component lengths defined by said path;
c) heating said structure intermediate its ends while stretching the structure according to step (b);
d) holding each formed component length of the structure in place while successive component lengths are formed; and
e) cooling the structure.

When the predefined path includes one or more curvilinear portions, each portion is defined as a plurality of component lengths given as dependent variables S, x, y and independent variables L, R and $\theta$; where x,y are coordinates of points that generate the cam track path of the apparatus for forming the shaped structure
L is the length of the unformed material
S is the intermediate arc length of one of component sections
R is the radius of curvature of the arc S
D is the offset distance of the x,y coordinates from a line tangent to the arc S at its end point T
$\theta$ is the angular location of the coordinate of the tangent point T a) expressing x and y as a function of the independent variables L, R, D and $\theta$ such that when $S = R(90 - \theta)$, then
$x = R \cos(\theta) + (L - S) \sin(\theta) + D \cos(\theta)$
$y = R \sin(\theta) - (L - S) \cos(\theta) + D \sin(\theta)$
b) deriving x and y; and
c) shaping said composite from a straight length fiber reinforced resin matrix material by stretching said straight length in a path defined by said x,y coordinates.

Preferably the fibers are randomly broken and are oriented in transverse and non-transverse directions with respect to the longitudinal axis of the structure. The hold step (b) maintains the orientation of the fibers relative to one another within about ±5 degrees of their orientation to the longitudinal axis of the shaped structure.

In a preferred embodiment, the shapes are enclosed within thin aluminum sheeting, preferably in the range of 1/32 to ⅛ inch thick depending on the size and geometry of the part to be formed. The purpose of the aluminum sheeting covering the composite material is to maintain the integrity of the softened thermoplastic material during forming. Other materials may be used when the process conditions, such as time, temperature or pressure require them. After the part is formed, then the aluminum or other material is removed.

The product is defined as an elongated composite structure shaped into a predefined path, said path having curvilinear portions, each portion being defined by a radius of curvature about a center, said structure comprising a resin matrix reinforced with fibers, said fibers being oriented with respect to the longitudinal axis of said structure in substantially transverse and non-transverse directions, said fibers oriented in the non-transverse directions of a curvilinear portion being curved with respect to the center for the radius of that curvilinear portion, said fibers oriented in the transverse direction of a curvilinear portion being directed toward the center for the radius of curvature of that curvilinear portion.

The product may involve a number of different cross sectional shapes that may be classified by the number of laminate surfaces and junctions of those surfaces. For example, an L, C, O, Z or hat section may be considered to have two laminate surfaces and no junctions, while a T or J section may be considered to have three laminate surfaces with one junction An I or H section has four laminate surfaces with two junctions.

The apparatus of this invention is defined as a computer-aided system that includes a fixed forming tool having a surface defined by the predefined path into which the fiber reinforced structure is to be formed, a means for heating the forming tool, a means for stretching the structure from each of its ends into successive component lengths of the predefined path by applying a force to each end of the structure along its longitudinal axis away from the ends as the structure is formed, and means associated with the forming tool for separately holding each formed component length of the structure in place against the forming tool.

Suitable thermoplastic resinous materials which may be used as a resin matrix include, but are not limited to amorphous polyamides, polyether ketone ketones, polyether ether ketones, and amorphous or crystalline polyesters.

The resin of choice is reinforced with fibers as, for example, carbon fibers, glass fibers, thermoplastic fibers and aramid fibers.

In order to form certain cross sections, the interior portion of the cross sectional shape needs to be supported by a formable member that is flexible in the forming or longitudinal direction while being rigid in the supporting directions which are substantially perpendicular to the longitudinal direction and can withstand process conditions. In the preferred embodiment, this formable member is a stack of steel strips.

DESCRIPTION OF THE PREFERRED EMBODIMENT

Figure 1:
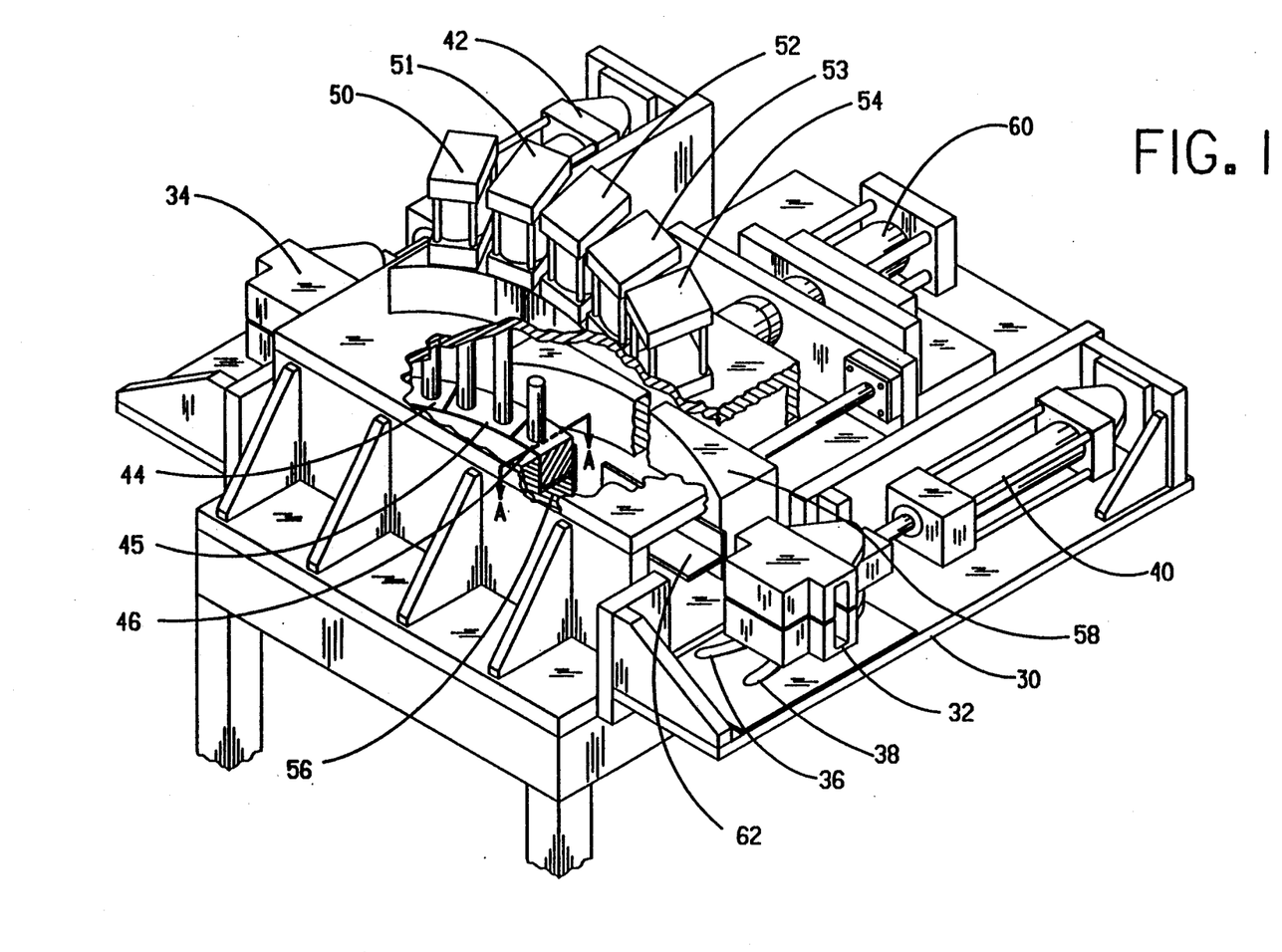
FIG. 1 is a schematic of an apparatus useful in shaping fiber reinforced resin material according to the invention.

The preferred embodiment of this invention provides a method for shaping a fiber reinforced resin matrix structure and, as shown in FIG. 1, the apparatus useful in performing the method generally includes a frame 30, a pair of end clamps 32, 34 in opposed locations on the frame, two pair of cam tracks positioned at the opposed locations, only one pair 36, 38 shown, a pair of hydraulic cylinders 40, 42 pivotally connected between the frame and the clamps, a plurality of holding tools 44, 45, 46, 47 and 48 (47, 48 not shown) attached to the frame. Each holding tool being configured to form a component length of the shaped structure. A plurality of hydraulic cylinders 50, 51, 52, 53 and 54 are attached to the top surface of the holding tools 45, 46, 47 and 48. A forming die comprising a base tool 56 heated by electric cartridge heaters 85 (FIG. 5) (Watlow Electric Manufacturing Co., Firerod cartridge heater J10A62), fixed to the frame 30 and a cap tool 58 connected to hydraulic cylinder 60, which is fixed to frame 30, for movement toward and away from the base tool is located between end clamps 32, 34. A stock length 62 is clamped at each of its ends in clamps 32, 34 and is positioned between holding tools 45, 46, 47 and 48 and base tool 56.

Figure 2:
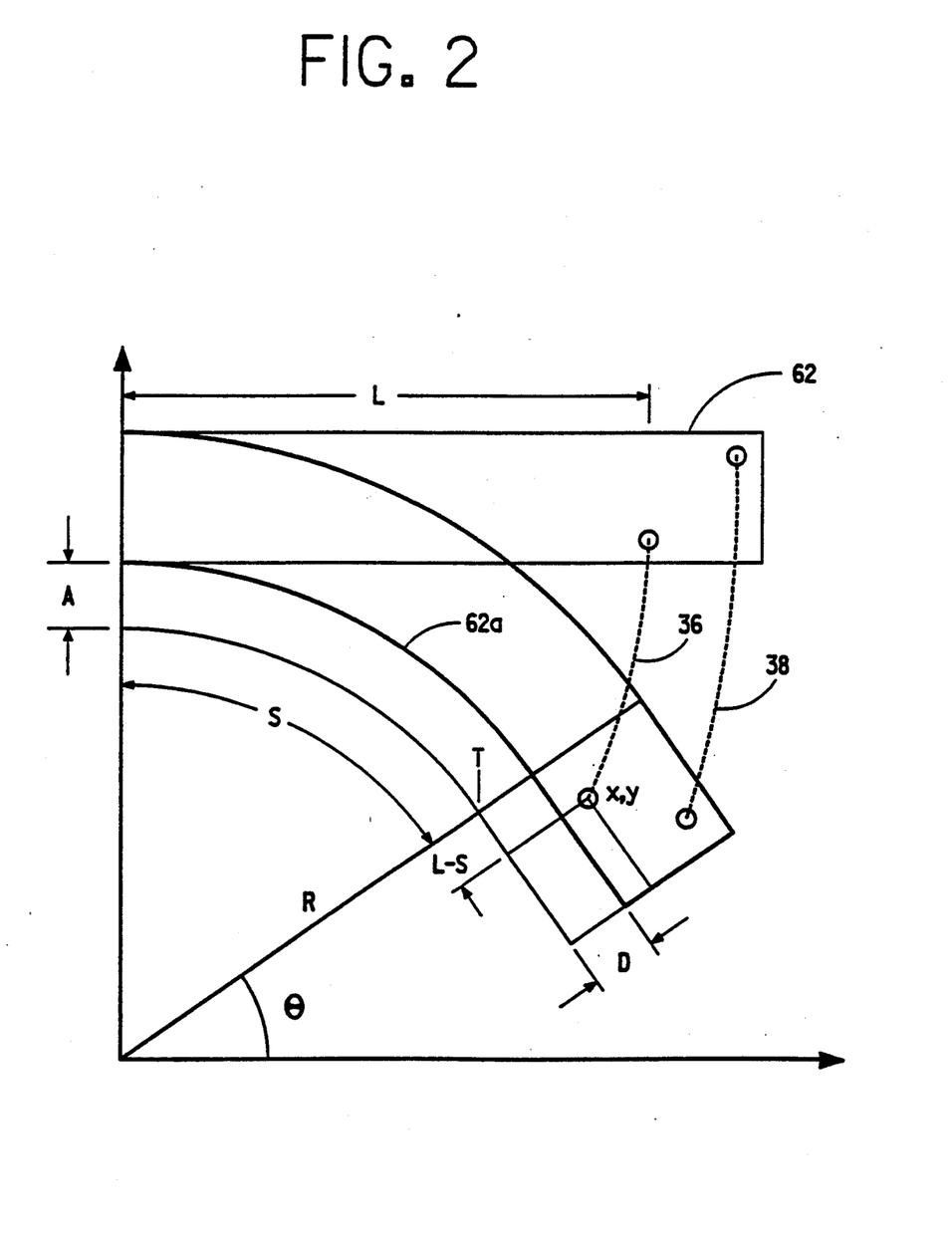
FIG. 2 is a schematic illustration of a format for calculating the cam track path of the apparatus shown in FIG. 1.

As best shown in FIG. 2, the path of the cam tracks 36, 38 is generated from the geometry of the final curvilinear shape desired as defined by the lower edge 62a of the final shaped component length. More particularly, when forming a shaped article in a predefined path of a plurality of component lengths, each component length being determined by dependent variables S, x, y and independent variables L, R, D and $\theta$ wherein x,y are coordinates of points that generate the cam track path 36, 38, L is the length of the unformed material, S represents the intermediate arc length of one of the component lengths, R is the radius of curvature of the arc S, D is the offset distance of the x,y coordinates from a line tangent to the arc S at its end point T, and $\theta$ is the angular location of the coordinate of the tangent point T. The remaining portion of the straight length is equal to L minus S. In order to properly determine the shape of the cam tracks, it is necessary to define arc length S as having zero stretch spaced a uniform distance A from the lower edge 62a.

The x,y coordinates are expressed as a function of the independent variables L, R, D and $\theta$ such that when $S = R(90 - \theta) D i/180$ radius then:

$$x = R \cos(\theta) + (L-S) \sin(\theta) + D \cos(\theta)$$

$$y = R \sin(\theta) - (L-S) \cos(\theta) + D \sin(\theta)$$

Figure 3:
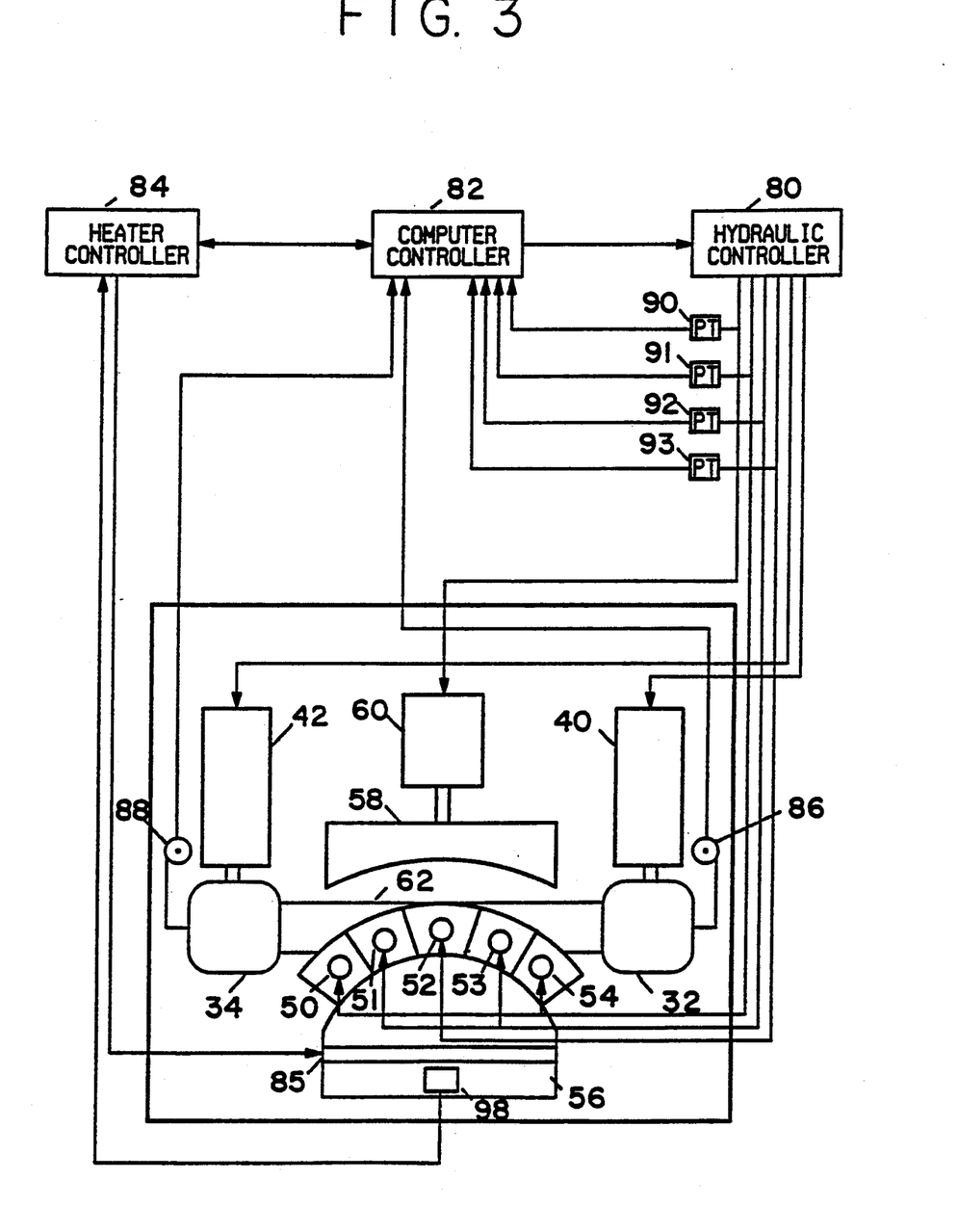
FIG. 3 is a schematic block diagram of the computer controlled system for regulating the operation of the apparatus for shaping the fiber reinforced resin matrix structures of this invention.

Referring now to FIG. 3, computer 82 (Allen Bradley programmable logic controller, Series 515, Model 1785-LT) is connected at its output terminals to a hydraulic controller 80 and a heater controller 84. The hydraulic controller 80 in turn is connected to cylinders 40, 42, 50, 51, 52, 53 and 54 and 60. The heater controller 84 is connected to electric cartridge heater 85 located in base tool 56. Inputs to the computer include position sensors 86, 88 located on end clamps 32, 34 for the purpose of signalling when the hydraulic cylinders 40, 42 have stretched the stock length 62 to the intermediate positions corresponding to the tangent points of the individual component lengths. Additional inputs to the computer consist of pressure transducers 90, 91, 92 and 93 for the purpose of determining when sufficient holding and consolidation pressure has been achieved Thermocouple 98 in base 56 is inputted to the heater controller 84 for the purpose of sensing the temperature and signalling the controller.

Figure 4:
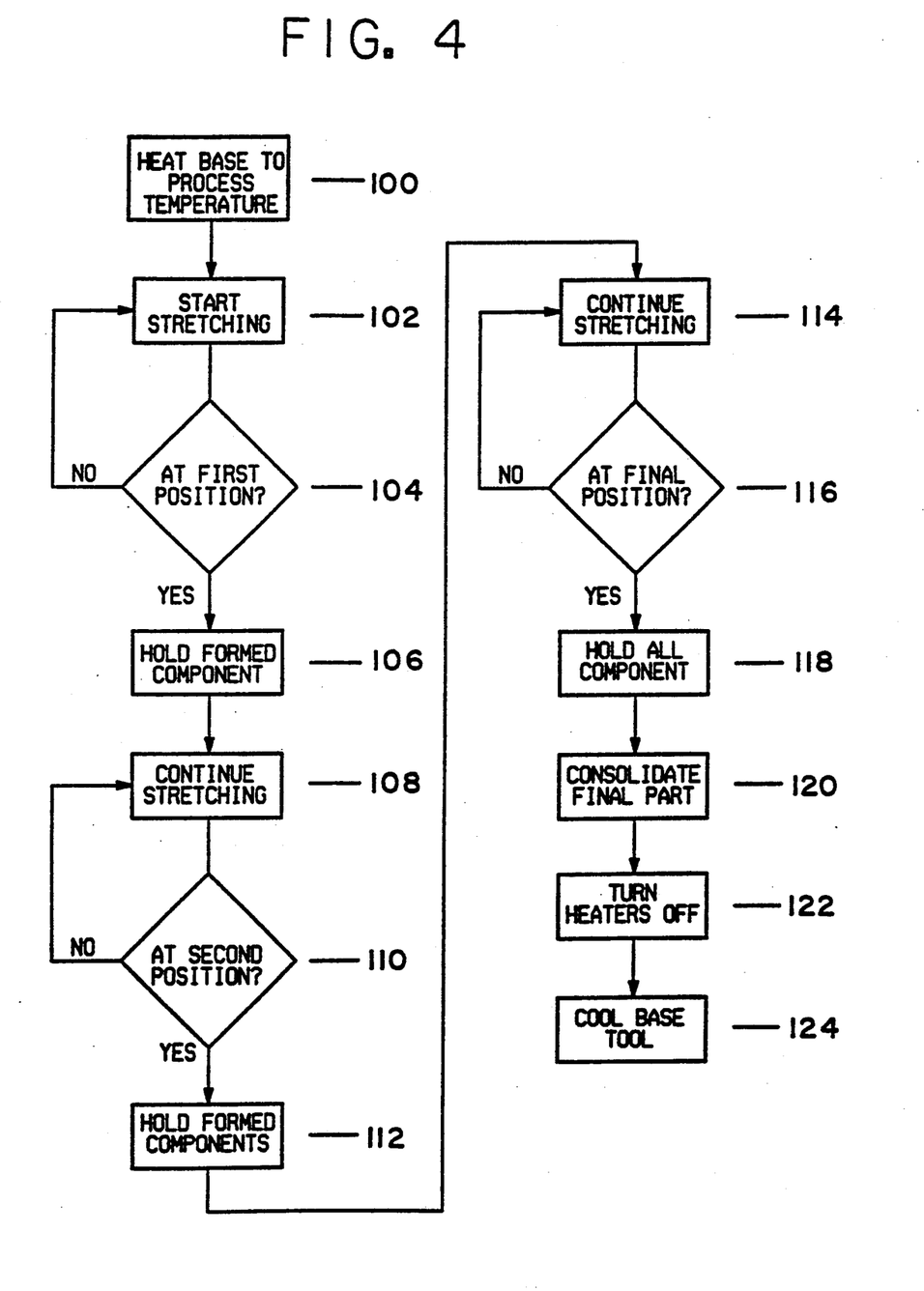
FIG. 4 is the logic flow diagram of the computer program for the operation of the apparatus.

The logic flow diagram (FIG. 4) illustrates the operation of the apparatus as follows: upon placement of the stock length 62, clamped into end clamps 32, 34, the sequence of operation is started In step 100, heat is applied to the electric cartridge heaters 85 through the heater controller 84. Thermocouple 98 senses the level of the temperature and signals when the operating temperature is reached. The computer signals the hydraulic controller 80 to start the stretching operation (step 102) and clamps 32, 34 are moved in tracks 36, 38 via hydraulic cylinders 40, 42 which are attached to the respective clamps to form a first component length When the first component length position is reached, as sensed by sensors 86, 88 signals are fed to computer 82 (step 104) which in turn signals controller 80 to actuate cylinder 52 which moves holding tool 46 against the stock length 62 to hold the formed component length in place as indicated in step 106. In the next step in the program, the computer signals hydraulic controller 80 to continue stretching until the two adjacent component lengths are formed (step 108). When the two adjacent component lengths are formed at the second stretching position as sensed again by sensors 86, 88 (step 110), signals are fed to the computer 82 which in turn signals controller 80 to actuate cylinders 51, 53 which move their respective holding tools against the stock length to hold these formed component lengths in place (step 112). In the next step in the program, the computer signals hydraulic controller 80 to continue stretching until the two final component lengths are formed (step 114). When the two final component lengths reach their final position as sensed again by sensors 86, 88 (step 116), signals are fed to the computer 82 which in turn signals controller 80 to actuate cylinders 50, 54 which move their respective holding tools against the stock length to hold the formed component lengths in place (step 118). At the actuation of the final holding cylinders, the computer signals the hydraulic controller to actuate the cap tool cylinder 60 to consolidate the final part, turns the heaters 85 off and circulates cooling fluid (in a manner not shown) through the base tool 56 as indicated by steps 120, 122 and 124.

Figure 5:
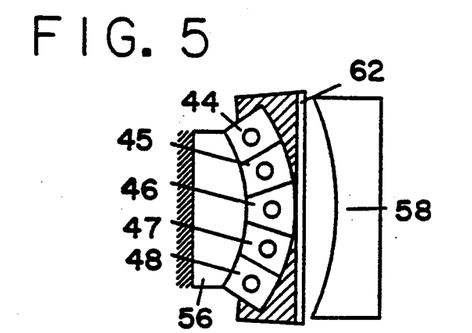
FIGS. 5-12 are schematic illustrations of the steps of the operation of the apparatus of FIG. 1 in shaping a structure of the invention.
Figure 6:
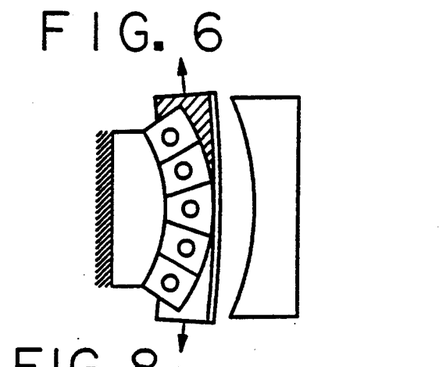
Figure 7:
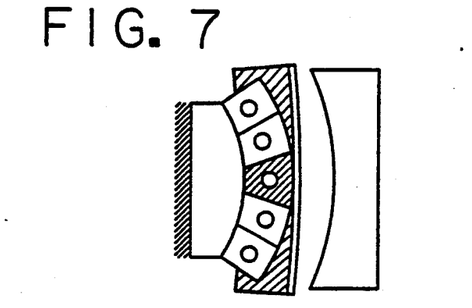
Figure 8:
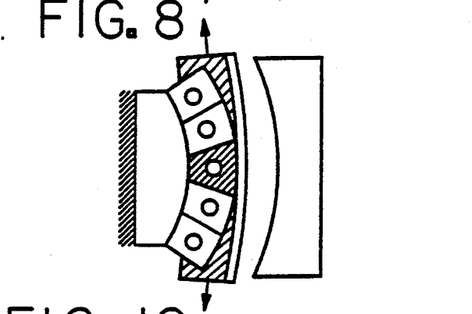
Figure 9:
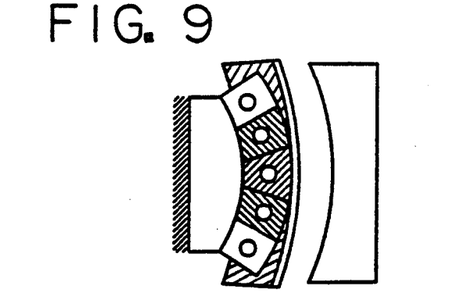
Figure 10:
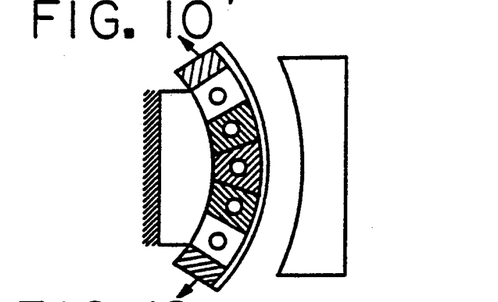
Figure 11:
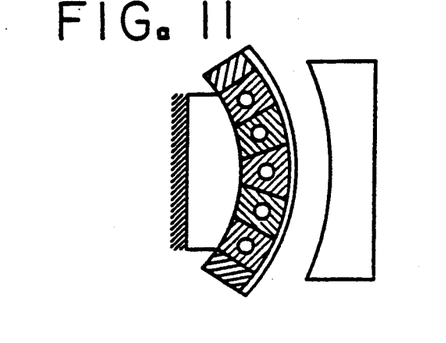
Figure 12:
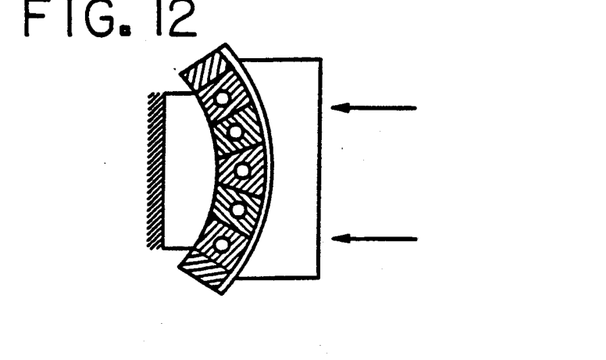
Figure 13:
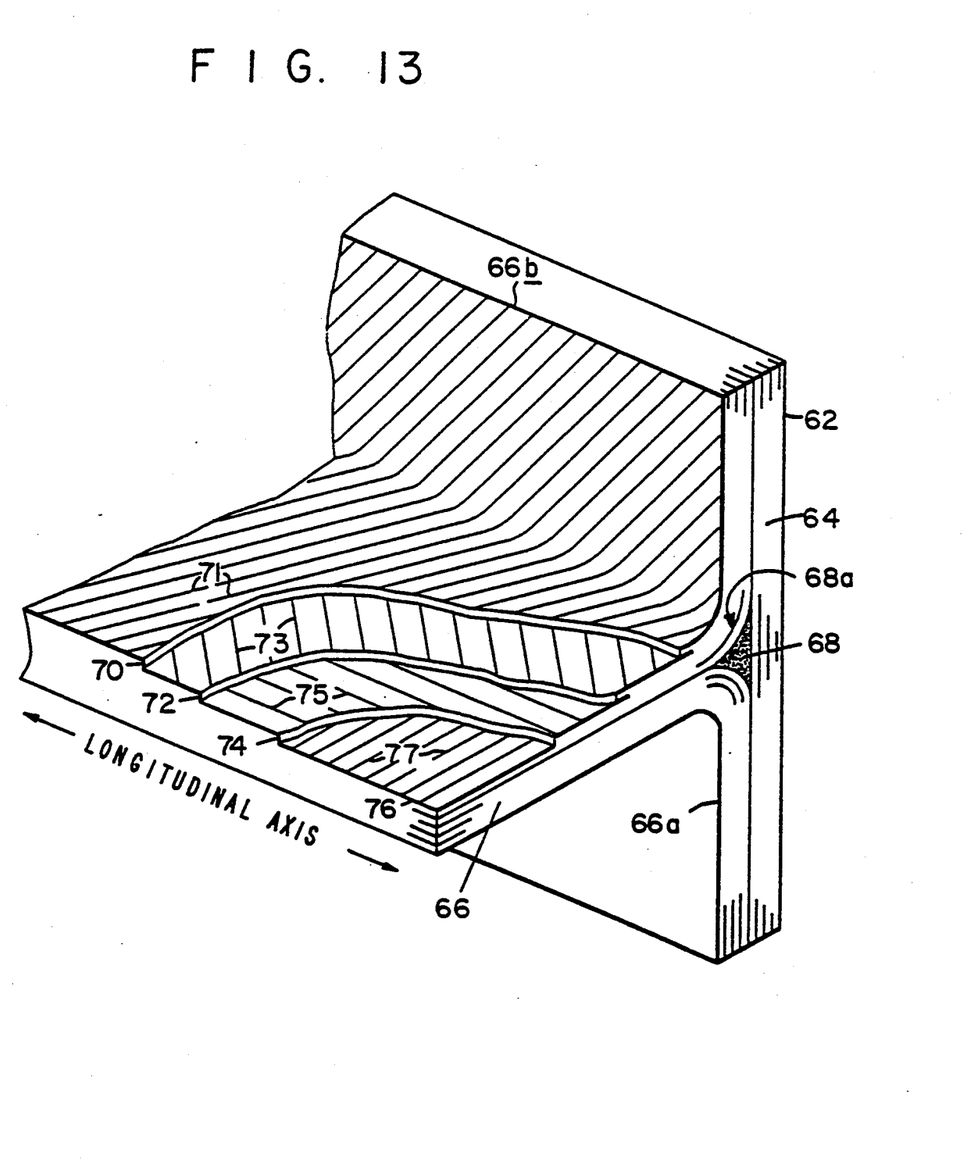
FIG. 13 is a perspective view, partially broken away to show the individual plies of a straight stock structure prior to shaping.
Figure 14:
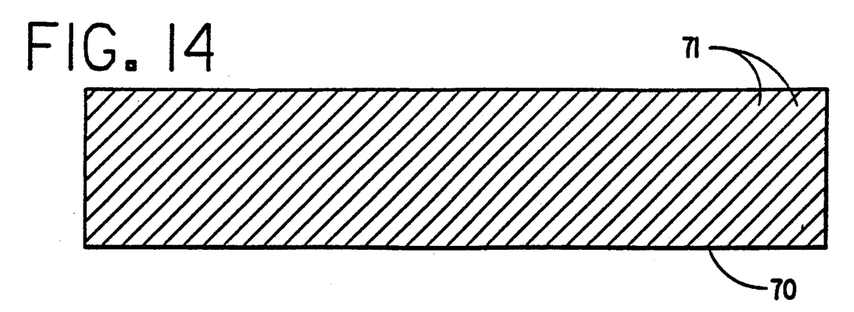
FIGS. 14-17 are schematic plan views of the individual plies in FIG. 13 showing fiber orientation.
Figure 15:
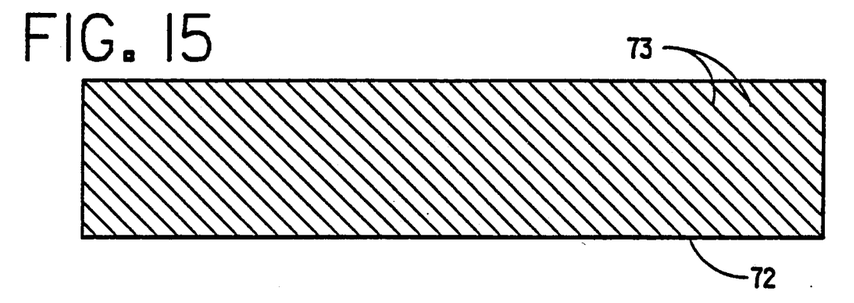
Figure 16:
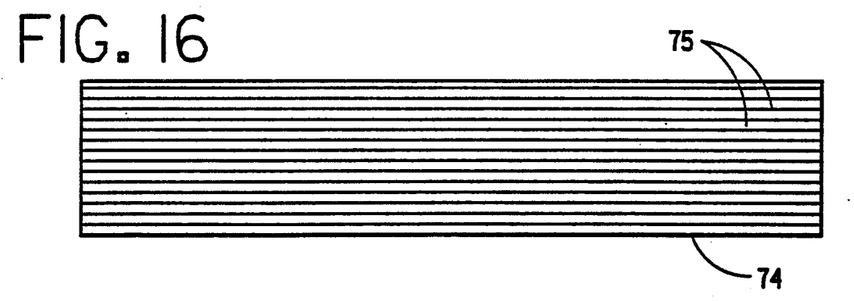
Figure 17:
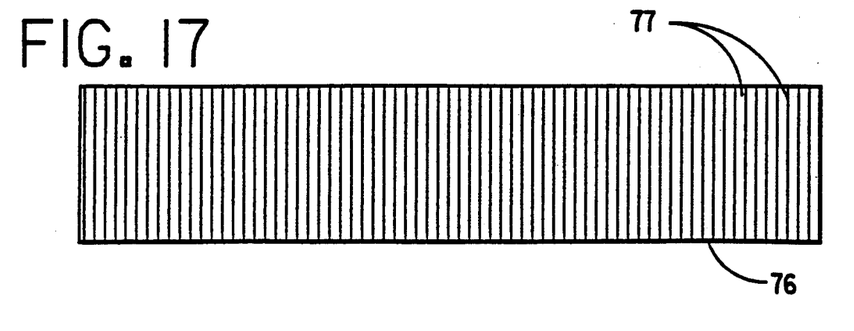
Figure 18:
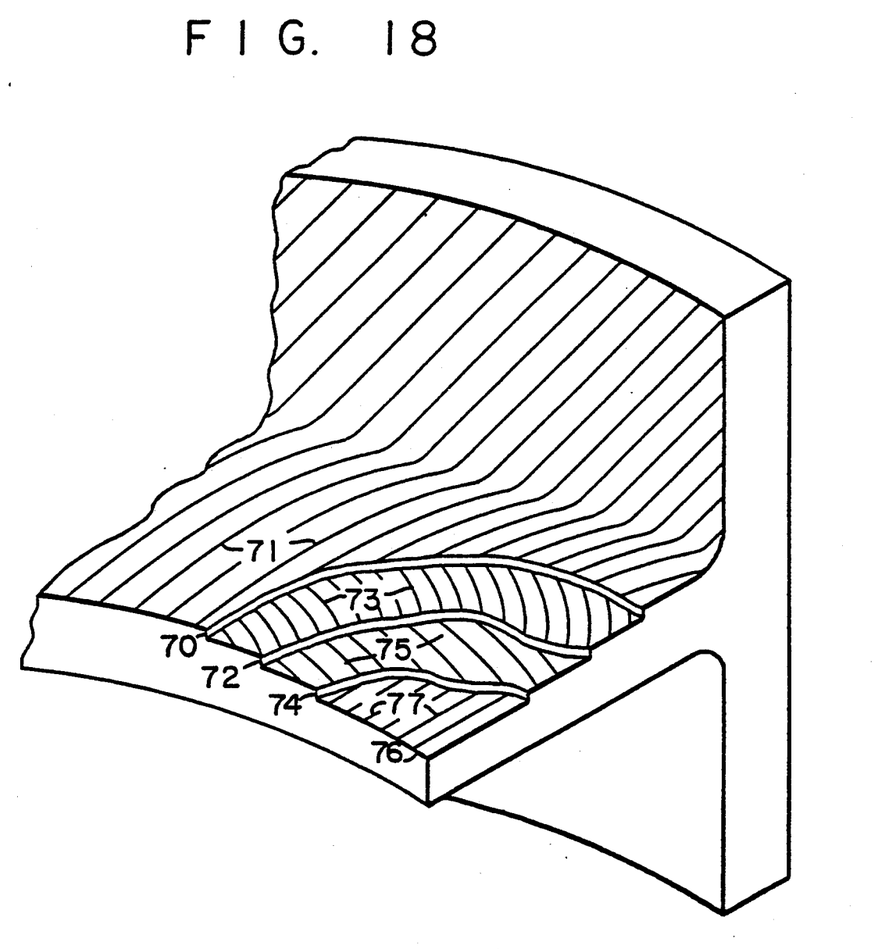
FIG. 18 is a perspective view, partially broken away to show individual plies, of a shaped structure made according to the invention.
Figure 19:
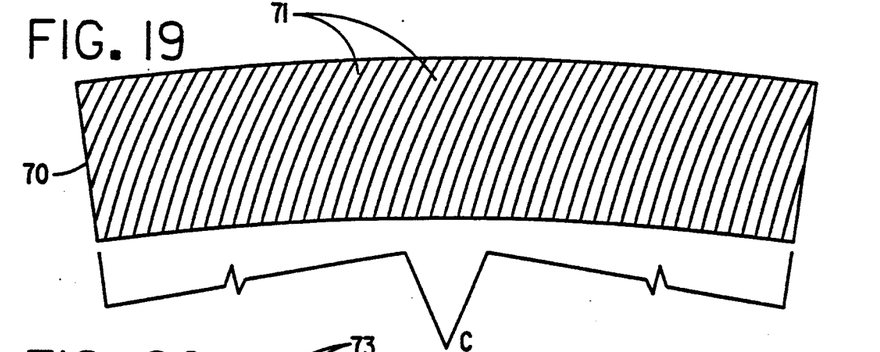
FIGS. 19-22 are schematic illustrations of fiber orientation in various plies of the shaped article of FIG. 18.
Figure 20:
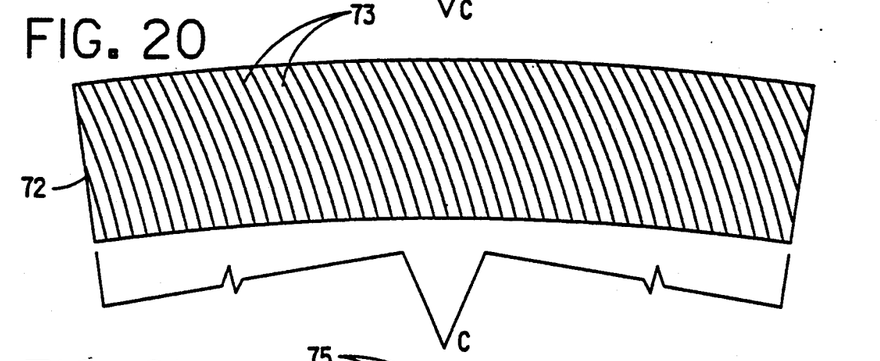
Figure 21:
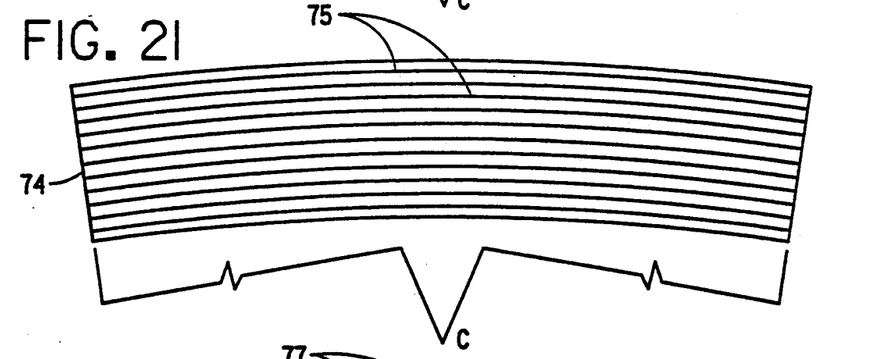
Figure 22:
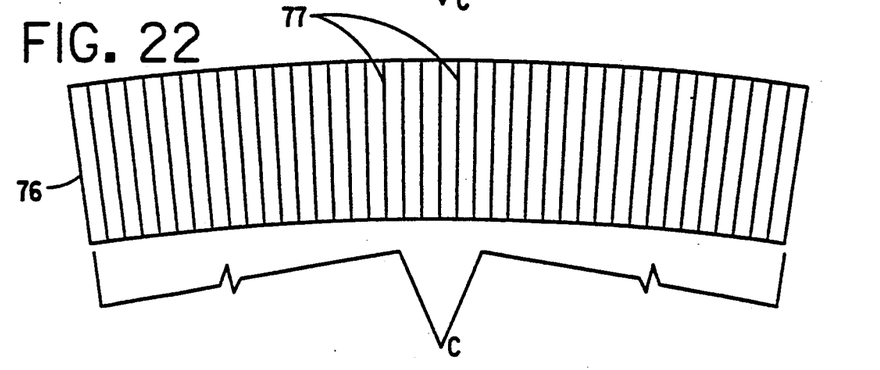
Figure 23:
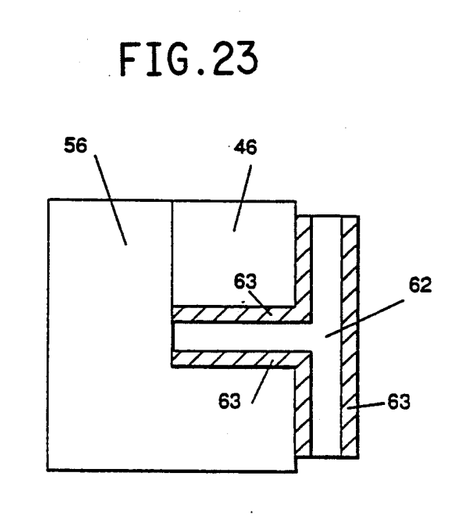
FIGS. 23-27 are enlarged cross sectional views taken along line A—A of FIG. 1 representing the forming of T, H, C, J and 0 or hollow shaped cross sectioned parts respectively.
Figure 24A:
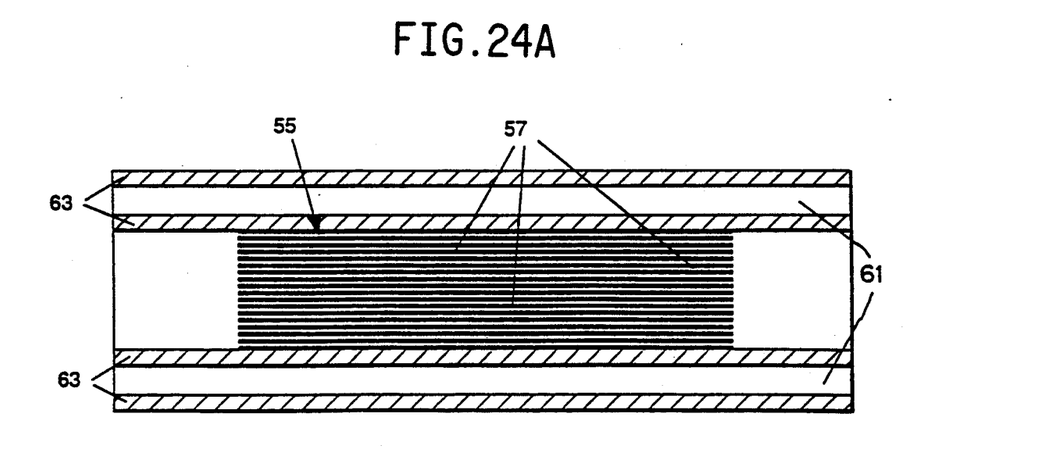
FIG. 24a is a broken away enlarged plan view of FIG. 24b designed to show the structure of the support member used.
Figure 24B:
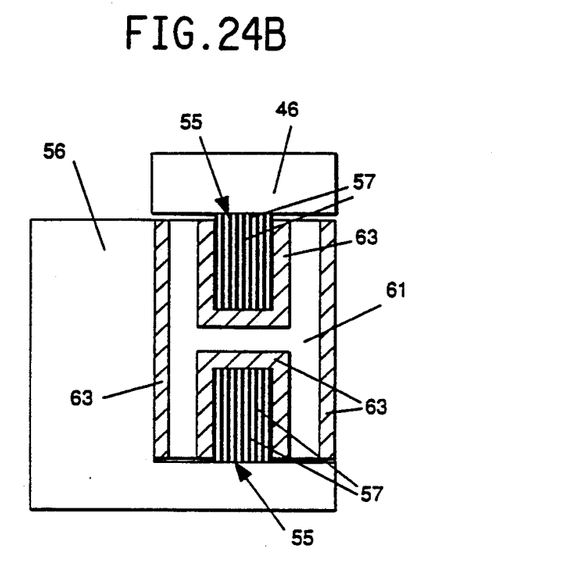
Figure 25:
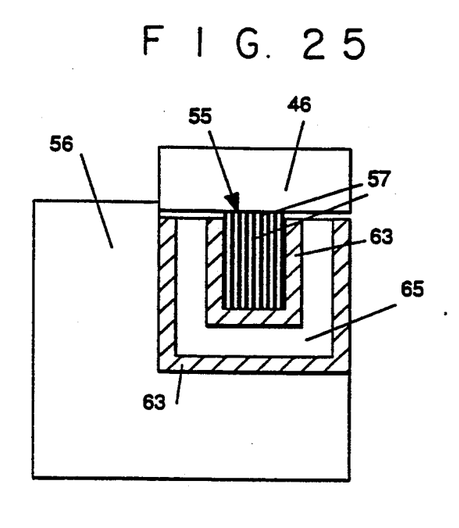
Figure 26:
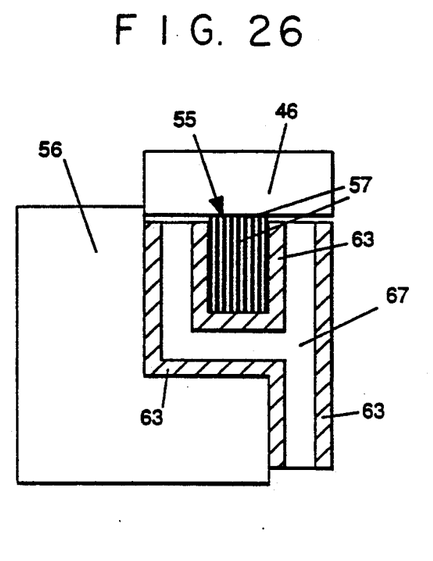
Figure 27:
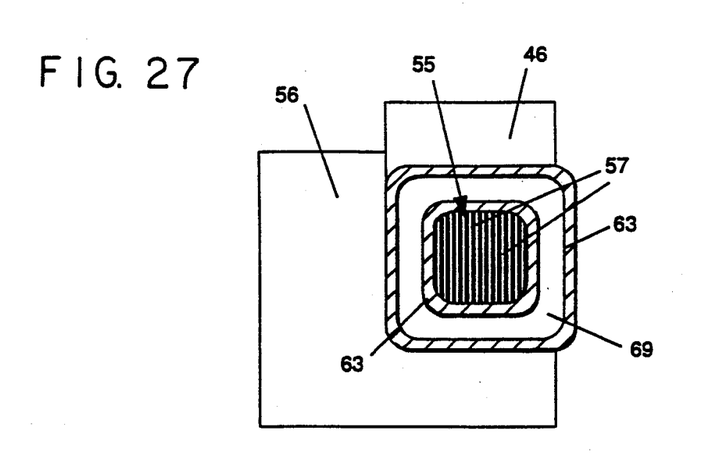

The forming steps are best shown in FIGS. 5–12. FIG. 5 illustrates the initial set-up with the stock length 62 located in the forming apparatus with no force applied. The stock length 62 is clamped in position and then heat is applied via base 56. When the stock length 62 reaches the process temperature for the particular resin employed, the stock part is stretched to form the center component length (FIG. 6) by extending cylinders 40, 42 until the straight length is tangent to the arc at the end of the center component length. Once this center component is formed, the holding tool cylinder 52 is extended to move holding tool 46 to hold the component length in place (FIG. 7) while the adjacent component lengths are formed (FIG. 8) and held (FIG. 9). The final stretching occurs for the remaining component lengths (FIG. 10) and then the formed part is consolidated by the remaining holding tools 44, 48 (FIG. 11) and the cap tool 58 (FIG. 12).

The stock length 62 is best described by FIGS. 13–17 and is seen to consist of a cap portion 64, web portion 66 and a filler 68. This particular product as referred to above may be considered to have three laminate surfaces with one junction and one filler 68 More particularly, the three laminate portions are 66a, 66b and 64. The filler 68 is enclosed by the junction 68a. While we have described this specifically for the T section, the same descriptive arrangements apply for laminate surfaces, junctions and fillers of the other shaped structures mentioned above such as the L, C, O, Z, J, I and hat shaped sections The plies that form the web also form the lower portion of the cap. The upper portion of the cap is formed by additional plies. The cap portion and the web portion are composed of a plurality of plies with each ply consisting of fiber reinforced resin matrix material wherein the fibers in each ply are oriented with respect to the longitudinal axis in transverse and non-transverse directions. The fibers in the non-transverse direction are randomly broken while the fibers in the transverse direction may be continuous or randomly broken. More particularly, the fibers 71 in ply 70 are oriented at 45° to the longitudinal axis, the fibers 73 in ply 72 are oriented at −45° to the longitudinal axis, the fibers 75 in ply 74 are oriented at 0° to the longitudinal axis and the fibers 77 in ply 76 are oriented at 90° to the longitudinal axis. Thus the fibers in plies 70, 72 and 74 are oriented in substantially non-transverse directions while the fibers in ply 76 are transverse to the longitudinal axis. This can more clearly be seen by referring to FIGS. 14–17. Referring back to FIG. 13, a filler 68 consisting of fibers oriented at 0° direction to the longitudinal axis in a resin matrix material, is used to fill the void formed where the web intersects the cap.

Referring now to FIGS. 18–21, a stretch formed length is shown where in plies 70, 72, 74 the fibers 71, 73, 75 oriented in the non-transverse directions are curved with respect to the center C for the radius for that particular portion of the composite structure while the fibers 77 oriented in the transverse direction in ply 76 are directed toward the center for the radius for that particular portion. It should be noted that fibers in FIGS. 19–22 after shaping remain oriented with respect to each other and the longitudinal axis of the structure and thus insure the fibers are in the predicted location to provide the optimum strength for the particular application. While the preferred embodiment has been described as a composite structure in the form of a T, it is to be understood that this method may be used to an advantage to form parts that have other structural shapes.

Referring to FIGS. 23–27, alternate shaped cross section parts are shown along with the support members where needed. More particularly, in FIG. 23 there is shown a T-shaped cross section covered with aluminum sheeting 63 and held in place by holding tool 46 and base tool 56. Similarly in FIG. 24, an H-shaped composite structure 61 covered with aluminum sheeting 63 is held in place by holding tool 46 and base tool 56. With this particular configuration, the support members 55 are positioned in the interior portions of the H-shaped cross section. The support members comprise a plurality of stacked steel strips 57 as shown in FIG. 24a. The steel strips 57 are free to move in the longitudinal direction one with respect to the other. The support member structure is the same for FIGS. 25, 26 and 27 which show C-shaped, J-shaped and hollow O-shaped configurations held in place by holding tool 46 and base tool 56. It is to be understood that support members 55 are not clamped at its ends in clamps 32 and 34 as is the stock lengths 61, 62, 65, 67 and 69.

In the preferred embodiment the support 55 is disclosed as a stack of steel strips. It is to be understood that while the steel strips are preferred because they are flexible in the forming or longitudinal direction while being rigid in the supporting directions which are normally perpendicular to the longitudinal direction, any other support member which would meet these criteria would also be suitable for this purpose.

I claim:

1. An apparatus for shaping an elongated composite structure of a thermoplastic resin matrix reinforced with fibers into a predetermined path of successive component lengths comprising:
   a) a fixed forming tool having a surface defined by said predefined path in contact with said structure;
   b) means for heating said forming tool;
   c) means for stretching said structure from each of its ends into successive component lengths by applying a force to each of said ends along the longitudinal axis of the structure away from said ends as the structure is formed; and
   d) means for separately holding each formed component length of the structure in place against said forming tool.

* * * * *